United States Patent
Sakai et al.

(10) Patent No.: US 11,458,568 B2
(45) Date of Patent: Oct. 4, 2022

(54) LASER PROCESSING METHOD

(71) Applicant: KABUSHIKI KAISHA TOSHIBA, Minato-ku (JP)

(72) Inventors: Tetsuo Sakai, Taito (JP); Yasutomo Shiomi, Kouza (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 200 days.

(21) Appl. No.: 16/292,391

(22) Filed: Mar. 5, 2019

(65) Prior Publication Data

US 2019/0283175 A1    Sep. 19, 2019

(30) Foreign Application Priority Data

Mar. 13, 2018  (JP) .............................. JP2018-045612

(51) Int. Cl.
*B23K 26/0622* (2014.01)
*B23K 26/22* (2006.01)
*B23K 26/06* (2014.01)
*B23K 26/21* (2014.01)
*B23K 103/10* (2006.01)
*B23K 26/26* (2014.01)

(52) U.S. Cl.
CPC ...... *B23K 26/0622* (2015.10); *B23K 26/0626* (2013.01); *B23K 26/22* (2013.01); *B23K 26/21* (2015.10); *B23K 26/26* (2013.01); *B23K 2103/10* (2018.08)

(58) Field of Classification Search
CPC ........................ B23K 26/0622; B23K 26/0626; B23K 26/22; B23K 26/26; B23K 26/21; B23K 2103/10; B23K 2103/02

USPC .......................... 219/121.61, 121.65, 121.66
See application file for complete search history.

(56) References Cited

U.S. PATENT DOCUMENTS

| | | | |
|---|---|---|---|
| 2002/0195432 A1* | 12/2002 | Sekiguchi | .......... B23K 26/0626 219/121.64 |
| 2017/0001261 A1 | 1/2017 | Fujiwara et al. | |
| 2019/0275618 A1* | 9/2019 | Wassmer | ................ B23P 6/007 |

FOREIGN PATENT DOCUMENTS

| | | | | |
|---|---|---|---|---|
| CN | 102091871 A | | 6/2011 | |
| CN | 103071924 A | * | 5/2013 | |
| CN | 105081573 A | * | 11/2015 | .......... B23K 26/123 |
| CN | 105729036 A | * | 7/2016 | |
| CN | 106001924 A | * | 10/2016 | |
| CN | 108511857 A | * | 9/2018 | |
| CN | 111001933 A | * | 4/2020 | |
| JP | 10-216973 A | | 8/1998 | |
| JP | 2011-200915 | | 10/2011 | |
| JP | 2011200915 A | * | 10/2011 | ............. B23K 26/00 |

(Continued)

*Primary Examiner* — John J Norton
*Assistant Examiner* — Simpson A Chen
(74) *Attorney, Agent, or Firm* — Oblon, McClelland, Maier & Neustadt, L.L.P.

(57) ABSTRACT

According to an embodiment of the invention, a laser processing method includes a first irradiation process and a second irradiation process. In the first irradiation process, a first laser light is irradiated on a first region of a processing object including a metal. A first output value of the first laser light is 3000 W or more. In the second irradiation process, a second laser light is irradiated on the first region. A second output value of the second laser light is not less than 60% and not more than 70% of the first output value.

5 Claims, 8 Drawing Sheets

(56) References Cited

FOREIGN PATENT DOCUMENTS

WO WO 2017/022238 A1 2/2017

* cited by examiner

LASER PROCESSING METHOD

CROSS-REFERENCE TO RELATED APPLICATIONS

This application is based upon and claims the benefit of priority from Japanese Patent Application No. 2018-045612, filed on Mar. 13, 2018; the entire contents of which are incorporated herein by reference.

FIELD

Embodiments described herein relate generally to a laser processing method.

BACKGROUND

A joining method that uses laser welding is used as a processing method having good production efficiency. For example, components that are included in an apparatus are welded to each other using laser light such as a pulsed laser, etc. In laser welding, there are cases where cracks and/or bubbles occur in the welded portion, and the reliability of the apparatus decreases.

DETAILED DESCRIPTION

According to an embodiment of the invention, a laser processing method includes a first irradiation process and a second irradiation process. In the first irradiation process, a first laser light is irradiated on a first region of a processing object including a metal. A first output value of the first laser light is 3000 W or more. In the second irradiation process, a second laser light is irradiated on the first region. A second output value of the second laser light is not less than 60% and not more than 70% of the first output value.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Embodiment

Figure 1:
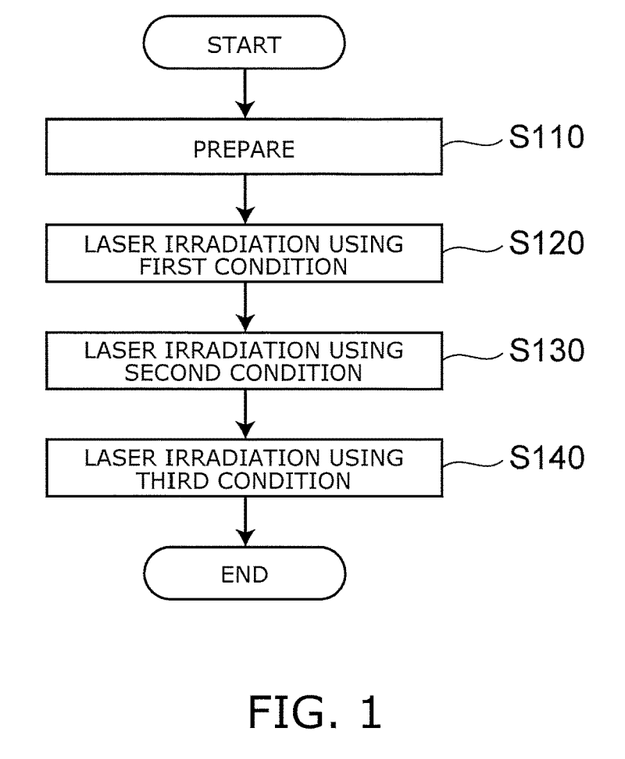
FIG. 1 is a flowchart showing a laser processing method according to an embodiment.

FIG. 1 is a flowchart showing a laser processing method according to an embodiment.

A processing object is prepared as shown in FIG. 1 (step S110). The processing object 10 (referring to FIG. 3A) is, for example, a structure body including a metal material. The processing object 10 includes, for example, a metal. The metal includes, for example, at least one selected from the group consisting of aluminum (Al) and iron (Fe). The processing object 10 may include, for example, an alloy including the metal recited above. The processing object 10 includes, for example, an aluminum alloy. The aluminum alloy includes at least one selected from the group consisting of aluminum, manganese (Mn), and magnesium (Mg).

After step S110, an irradiation based on a first condition is performed (step S120). In step S120, a first laser light is irradiated on a first region 10r of the processing object 10 (referring to FIG. 3A). The first region 10r includes, for example, at least a portion of a surface 10s of the processing object 10 (referring to FIG. 3A). The first laser light is irradiated on the first region 10r; and a portion of the processing object 10 (a portion including the first region 10r) is heated. A pulsed laser or the like is used as the laser emitting the first laser light. In the first condition, the output value of the first laser light is 3000 W or more. In the first condition, the output value of the first laser light may be, for example, not less than 3000 W and not more than 3300 W. In the first condition of one example, the irradiation time of the first laser light is not less than 1.0 ms and not more than 2.0 ms.

After step S120, an irradiation based on a second condition is performed (step S130). In step S130, a second laser light is irradiated on the first region 10r of the processing object 10 recited above. The second laser light is irradiated on the first region 10r of the processing object 10; and a portion of the processing object 10 (a portion including the first region 10r) is heated. For example, the pulsed laser or the like of step S120 may be used as the laser emitting the second laser light. Such a second laser light is irradiated on the first region 10r of the processing object 10 (the region where the first laser light is irradiated in step S120). In the second condition, the output value of the second laser light is not less than 60% and not more than 70% of the output value of the first laser light of the first condition. In the second condition, the output value of the second laser light is, for example, not less than 1800 W and not more than 2310 W. In the second condition of one example, the irradiation time of the second laser light is not less than 2.0 ms and not more than 3.0 ms.

After step S130, an irradiation based on a third condition is performed (step S140). In step S140, the third laser light is further irradiated on the first region 10r of the processing object 10 recited above. The third laser light is irradiated on the first region 10r of the processing object 10; and a portion of the processing object 10 (a portion including the first region 10r) is heated. For example, the pulsed laser or the like of steps S120 and S130 may be used as the laser emitting the third laser light. The output value of the third laser light of the third condition is lower than the output value of the second laser light of the second condition. For example, in the third condition, the output value of the third laser light may decrease as time elapses. For example, at least a portion of the temporal change of the output value of the third laser light may be set to decrease linearly as time elapses. In the third condition of one example, the irradiation time of the third laser light is not less than 0.5 ms and not more than 1.5 ms. For example, in the third condition, the irradiation time of the third laser light may be about 1.0 ms.

By steps S120 to S140, the laser light of the multiple conditions recited above is irradiated on the processing object 10; and a weld portion 20 inside the processing object 10 (referring to FIG. 3B, etc.) is heated. The weld portion 20 includes at least a portion of the first region 10r (referring to FIG. 3A). The metal at the weld portion 20 is melted by the heat due to the laser light. The welding is performed by the melted metal solidifying after the melting. For example, the laser processing method according to the embodiment is applicable to a method for manufacturing a secondary cell, etc. For example, a case inside the secondary cell can be joined using the laser processing method according to the embodiment. The terminals of multiple secondary cells can be electrically connected to each other using the laser processing method according to the embodiment.

Examples of irradiation conditions of the laser for the laser processing will now be described. An example of the irradiation conditions of the laser light in the case where the laser light is emitted from a pulsed laser and irradiated on the processing object 10 will now be described.

Figure 2:
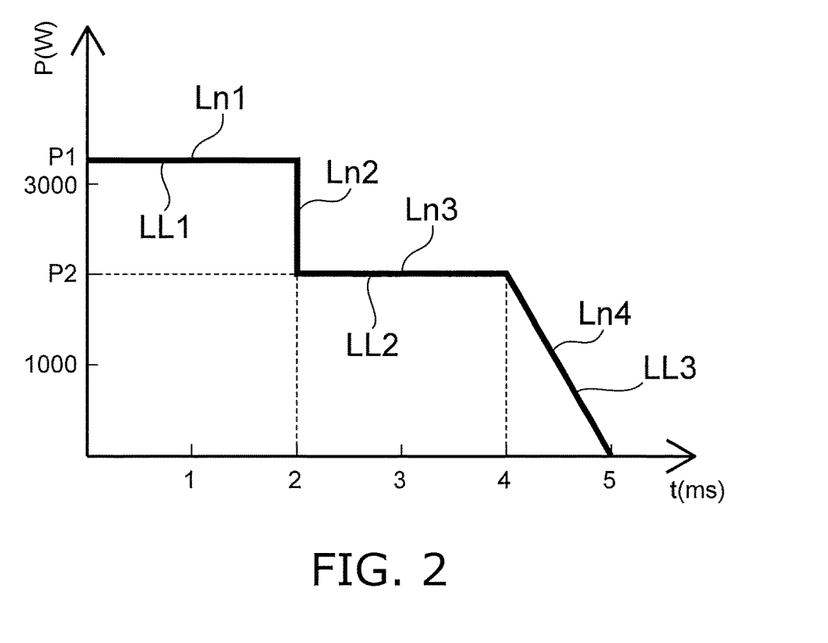
FIG. 2 is a figure showing the output of the laser.

FIG. 2 is a figure showing the output of the laser.

FIG. 2 shows an example of the relationship between the output value of the laser light and the irradiation time. The horizontal axis of FIG. 2 corresponds to a time t (ms). The vertical axis of FIG. 2 shows an output value P (W) of the laser light.

As shown by a line Ln1 of FIG. 2, a first laser light LL1 based on the first condition is irradiated on the surface 10s (the first region 10r) of the processing object 10. For example, for the first laser light LL1, the output value P is a first output value P1; and the irradiation time is 2.0 ms. In the example, the first output value P1 is 3100 W. For example, the first laser light LL1 of the first output value P1 is irradiated on the surface 10s (the first region 10r) of the processing object 10 for a time of 2.0 ms. The line Ln1 shown in FIG. 2 corresponds to the irradiation condition of the laser light of step S120 of FIG. 1.

Then, as shown by a line Ln2 of FIG. 2, the output value P of the laser light is set to be lower.

Then, as shown by a line Ln3 of FIG. 2, a second laser light LL2 based on the second condition is irradiated on the surface 10s (the first region 10r) of the processing object 10. For example, for the second laser light LL2, the output value P is a second output value P2; and the irradiation time is 2.0. In the example, the second output value P2 is 2000 W. For example, the second laser light LL2 of the second output value P2 is irradiated on the surface 10s (the first region 10r) of the processing object 10 for a time of 2.0 ms. The line Ln3 of FIG. 2 corresponds to the irradiation condition of the laser light of step S130 of FIG. 1.

Then, as shown by a line Ln4 of FIG. 2, a third laser light LL3 based on the third condition is irradiated on the surface 10s (the first region 10r) of the processing object 10. For example, for the third laser light LL3, the output value P is lower than the second output value P2; and the irradiation time is 1.0 ms. The output value P of the third laser light LL3 gradually decreases. For example, at least a portion of the gradual decrease is linear as the time t elapses. The line Ln4 of FIG. 2 corresponds to the irradiation condition of the laser of step S140 of FIG. 1.

In the embodiment, the output value P of the pulsed laser may include, for example, the conditions illustrated by the lines Ln1 to Ln4 of FIG. 2. Pulsed lasers that have such conditions are irradiated on the processing object 10.

Examples of states of the processing object 10 due to the laser processing will now be described.

FIG. 3A, FIG. 3B, FIG. 4A, FIG. 4B, FIG. 5A, FIG. 5B, FIG. 6A, and FIG. 6B are drawings showing states of the processing object 10.

These drawings show, in stages, the states of the weld portion 20 of the processing object 10 in the laser processing method according to the embodiment. Examples of the states of the processing object 10 are described hereinbelow for the case where the pulsed laser is irradiated on the processing object 10 from above in the drawing.

Figure 3A:
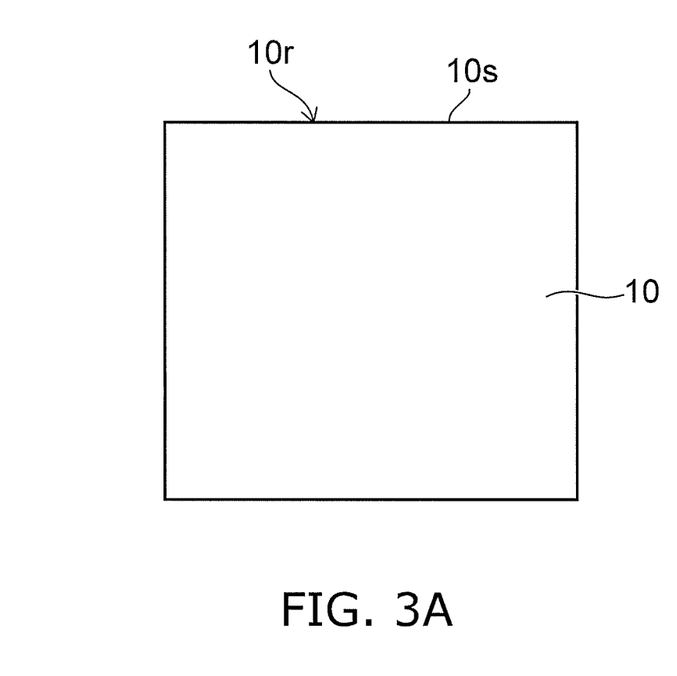
FIG. 3A and FIG. 3B are drawings showing states of a weld portion.

The processing object 10 is prepared as shown in FIG. 3A. The processing object 10 is, for example, a structure body including a metal material.

The state of the processing object 10 shown in FIG. 3A is the state of the processing object 10 before the laser light is irradiated. This state corresponds to the state of the processing object 10 of step S110 of FIG. 1. As shown in FIG. 3A, the processing object 10 includes the first region 10r. The first region 10r includes the surface 10s of the processing object 10.

Figure 3B:
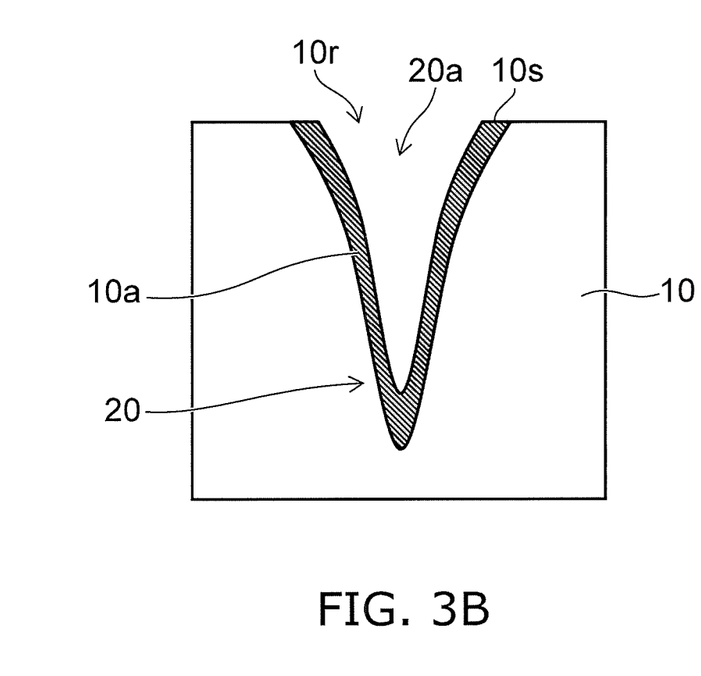

As shown in FIG. 3B, the first laser light LL1 of the first condition is irradiated on the first region 10 r of the processing object 10. The first laser light LL1 that is 3000 W or more is irradiated on the surface 10s of the processing object 10. The surface 10s of the processing object 10 is heated by the laser; thereby, the processing object 10 melts; and a liquid portion 10a is formed. In the case where the processing object 10 is formed of a metal material, the liquid portion 10a is a liquid metal. By melting the processing object 10, the weld portion 20 that includes a hole 20a is formed. The weld portion 20 includes the liquid portion 10a and the hole 20a.

Figure 4A:
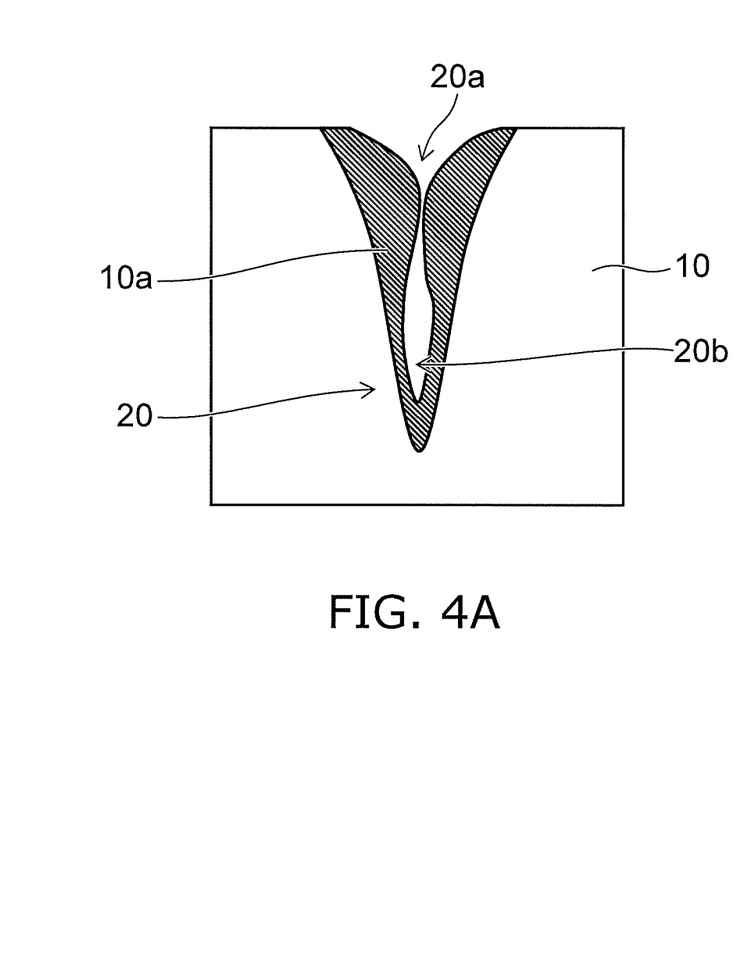
FIG. 4A and FIG. 4B are drawings showing states of the weld portion.

As shown in FIG. 4A, the irradiation based on the first condition is performed further. By the irradiation using the first condition, the processing object 10 is melted further; and the volume of the liquid portion 10a becomes large. By the irradiation of the laser, the temperature of the upper portion of the weld portion 20 becomes high. Compared to the lower portion of the weld portion 20, the volume of the liquid portion 10a becomes large easily at the upper portion. A void 20b forms at the lower portion of the weld portion 20 due to differences of how the volume of the liquid portion 10a increases within the weld portion 20.

The states of the processing object 10 shown in FIG. 3B and FIG. 4A correspond to the state of the processing object 10 of step S120 of FIG. 1. In the example shown in FIG. 4A, one void 20b is formed at the lower portion of the weld portion 20. There are also cases where multiple voids 20b are formed.

Figure 4B:
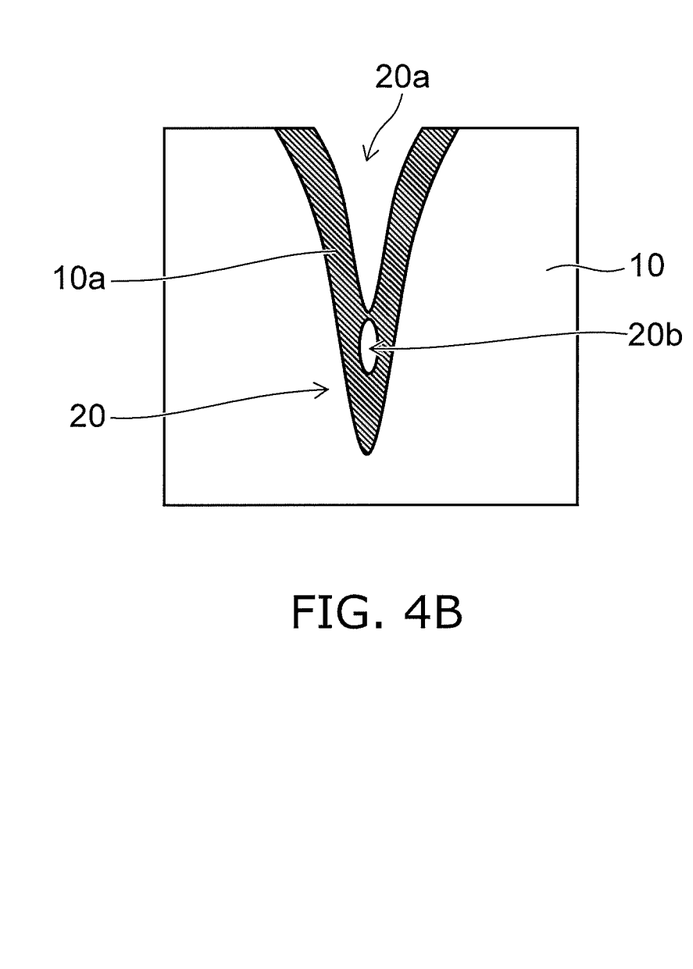

As shown in FIG. 4B, the irradiation based on the second condition is performed. The output value P of the laser light of the second condition is not less than 60% and not more than 70% of the output value P of the first condition. Thereby, the volume of the hole 20a increases; and the volume of the void 20b decreases. For example, by irradiating the laser using the second condition via the hole 20a, the liquid portion 10a at the periphery of the void 20b vibrates. As a result, the volume of the void 20b decreases.

Figure 5A:
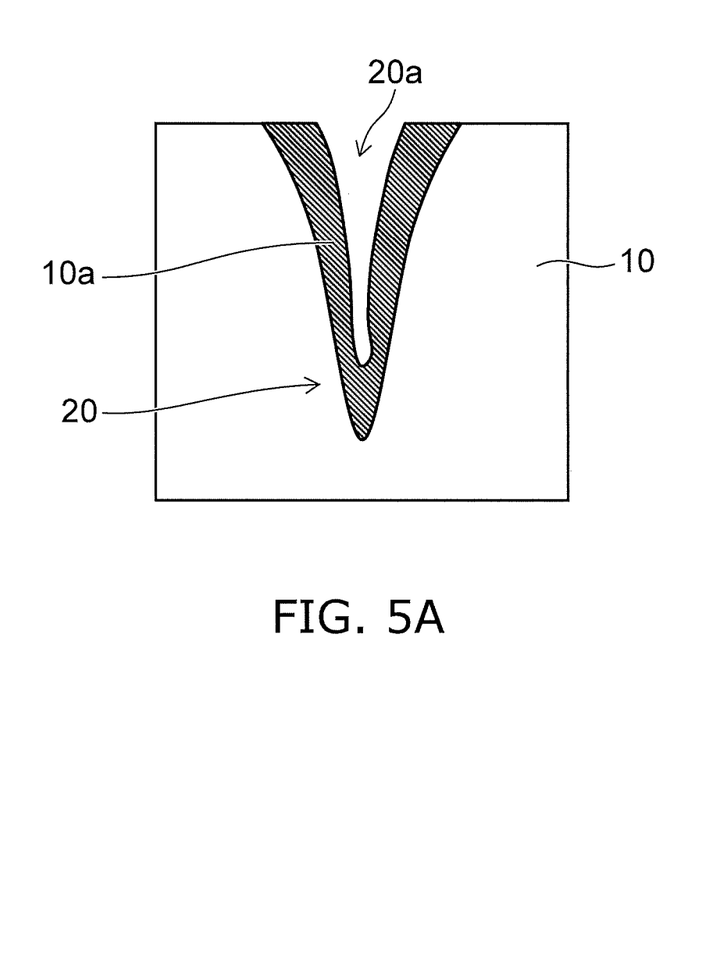
FIG. 5A and FIG. 5B are drawings showing states of the weld portion.

As shown in FIG. 5A, the irradiation based on the second condition is performed further. By the irradiation using the second condition, for example, the void 20b is removed; and the hole 20a remains in the weld portion 20. For example, by continuing the irradiation using the second condition via the hole 20a, the liquid portion 10a at the periphery of the void 20b vibrates; and the void 20b is removed. Thus, the void 20b that is formed by the irradiation using the first condition (referring to FIG. 4A) is removed.

The states of the processing object 10 shown in FIG. 4B and FIG. 5A correspond to the state of the processing object 10 of step S130 of FIG. 1. In the example of FIG. 4B and FIG. 5A, the void 20b is removed after the volume of the void 20b decreases. There are also cases where the void 20b remains after the volume of the void 20b decreases.

Figure 5B:
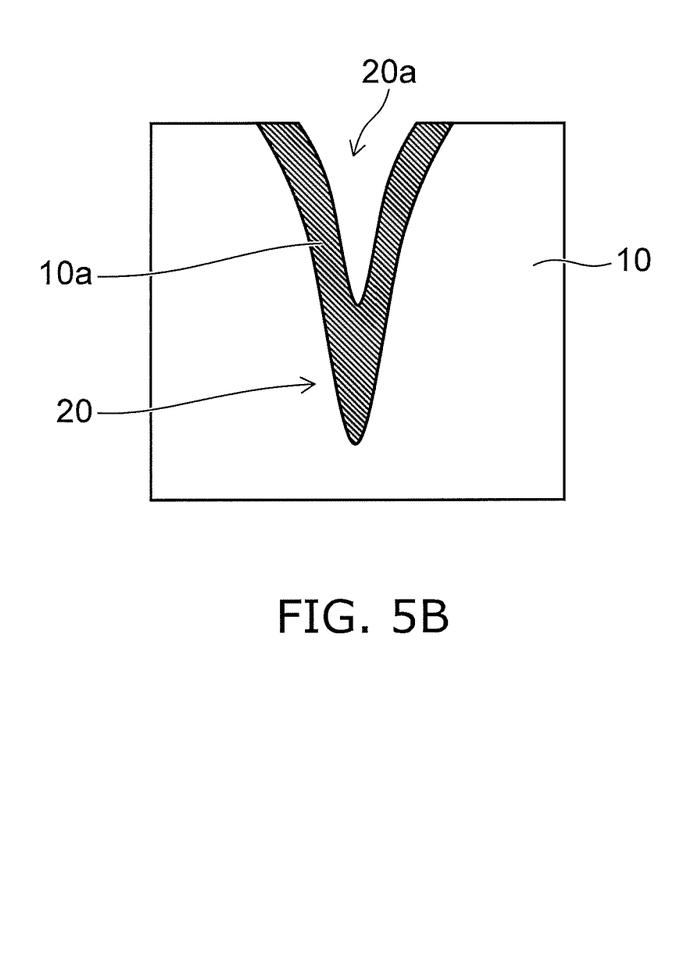

As shown in FIG. 5B, the irradiation based on the third condition is performed. In the third condition, the output value P of the laser light of the third condition is lower than the output value P of the second condition. Thereby, the volume of the liquid portion 10a increases; and the remaining space of the hole 20a becomes small.

Figure 6A:
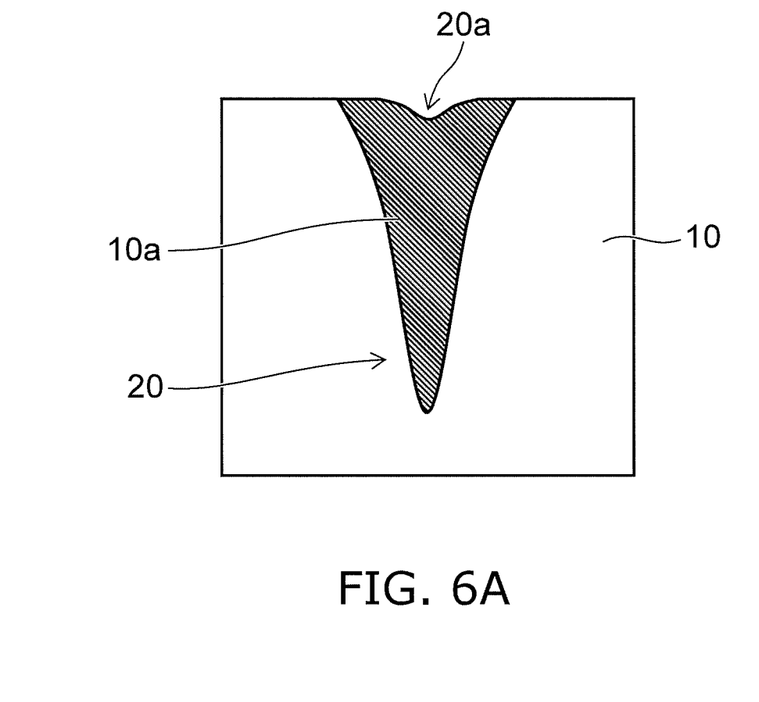
FIG. 6A and FIG. 6B are drawings showing states of the weld portion.

As shown in FIG. 6A, the irradiation based on the third condition is continued. By the irradiation using the third condition, the liquid portion 10a is formed in the hole 20a to fill the hole 20a.

The states of the processing object 10 shown in FIG. 5B and FIG. 6A correspond to the state of the processing object 10 of step S140 of FIG. 1.

Figure 6B:
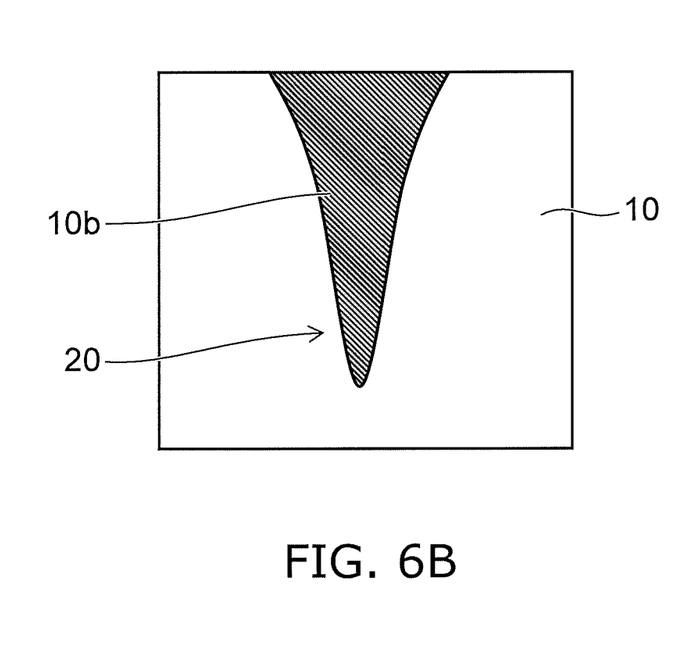

Subsequently, after the irradiation of the laser as shown in FIG. 6B, the liquid portion 10a changes into a solid portion 10b by, for example, the liquid metal solidifying at the weld portion 20. Thus, the welding processing is performed by the solidification of the melted metal.

A configuration example of a laser processing apparatus will now be described.

Figure 7:
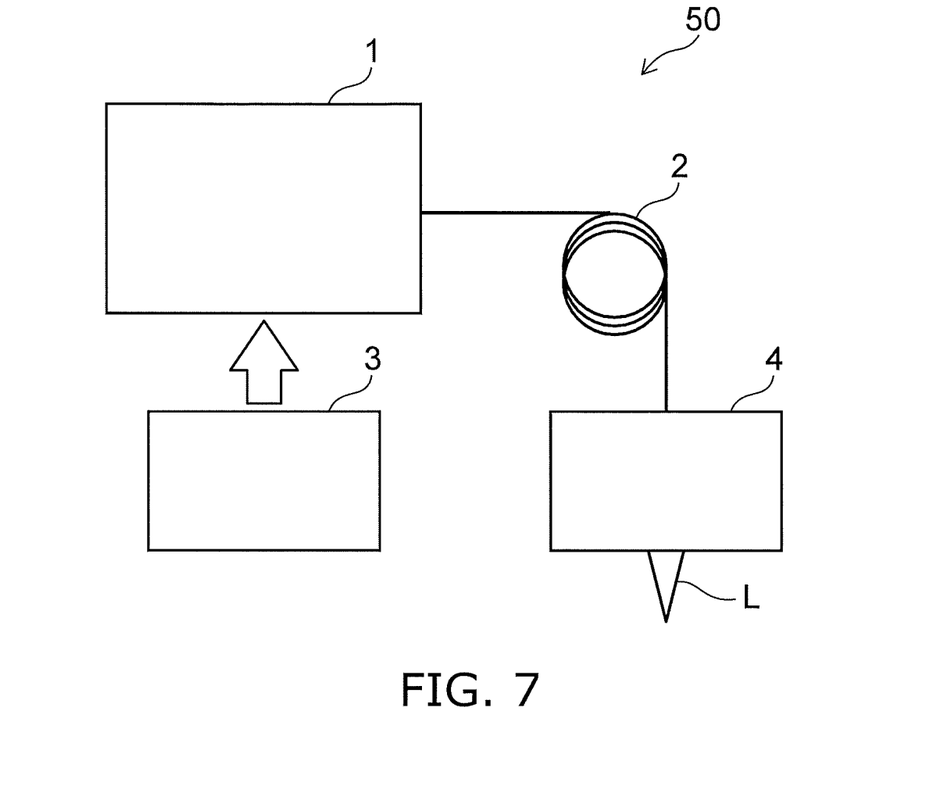
FIG. 7 is a drawing showing the configuration example of a laser processing apparatus.

FIG. 7 is a drawing showing the configuration example of the laser processing apparatus.

Figure 8A:
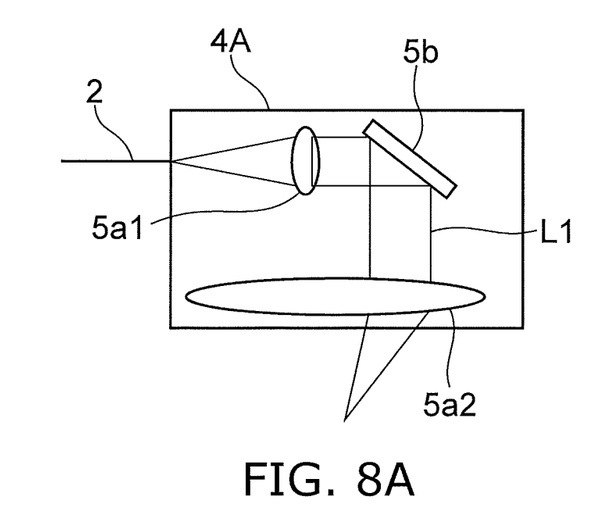
FIG. 8A and FIG. 8B are drawings showing portions of the laser processing apparatus.
Figure 8B:
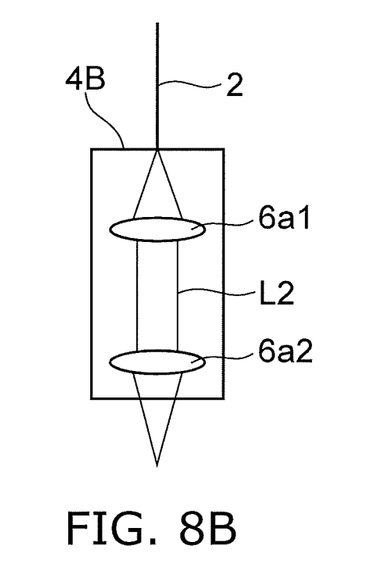

FIG. 8A and FIG. 8B are drawings showing portions of the laser processing apparatus.

The laser processing apparatus 50 for performing the laser processing method according to the embodiment is shown in FIG. 7; and configuration examples of a laser processing head 4 are shown in FIG. 8A and FIG. 8B.

As shown in FIG. 7, a laser oscillator 1, an optical fiber 2, a controller 3, and the laser processing head 4 are provided in the laser processing apparatus 50.

The laser oscillator 1 is, for example, a laser based on a crystal such as YAG, etc. The laser includes, for example, at least one of a fiber laser or a disk laser. The light of the pulsed laser propagates through the optical fiber 2. The controller 3 is connected to the laser oscillator 1 and makes pulse oscillation possible. The controller 3 sets the temporal change of the output value P of the pulsed laser. The controller 3 sets the oscillation frequency and the emission energy of the pulsed laser emitted from the laser oscillator 1. Laser light L is emitted from the laser processing head 4.

As shown in FIG. 8A, lenses 5a1 and 5a2 and a mirror 5b are provided in a laser processing head 4A. Laser light L1 from the optical fiber 2 is supplied to the laser processing head 4A. Inside the laser processing head 4A, the laser light L1 is condensed by the lens 5a1, subsequently reflected by the mirror 5b, and again condensed by the lens 5a2.

As shown in FIG. 8B, lenses 6a1 and 6a2 are provided in a laser processing head 4B. The lens 6a1 is, for example, a collimating lens. Laser light L2 from the optical fiber 2 is adjusted to be substantially parallel light by the lens 6a1. The laser light L2 from the optical fiber 2 is supplied to the laser processing head 4B. Inside the laser processing head 4B, the laser light L2 is caused to be substantially parallel light by the lens 6a1, and subsequently is condensed by the lens 6a2.

For example, the configuration of one of the laser processing head 4A or 4B is applicable to the laser processing head 4 of FIG. 7.

As illustrated in FIG. 7, the laser light L that is output from the laser oscillator 1 enters the optical fiber 2. The laser light L from the optical fiber 2 is supplied to the laser processing head 4. Subsequently, the laser light L from the laser processing head 4 is irradiated on the surface 10s of the processing object 10.

In the laser processing method according to the embodiment, as the first condition, a laser having the output value P of 3000 W or more is irradiated on the processing object 10; subsequently, as the second condition, a laser having the output value P of not less than 60% and not more than 70% of the output value P of the first condition is irradiated on the processing object 10. By such irradiation conditions, the occurrence of the void 20b at the weld portion 20 can be suppressed by irradiating the laser on the processing object 10 in stages.

The investigation results that formed the basis of discovering the irradiation conditions of the laser such as those recited above will now be described.

Figure 9:
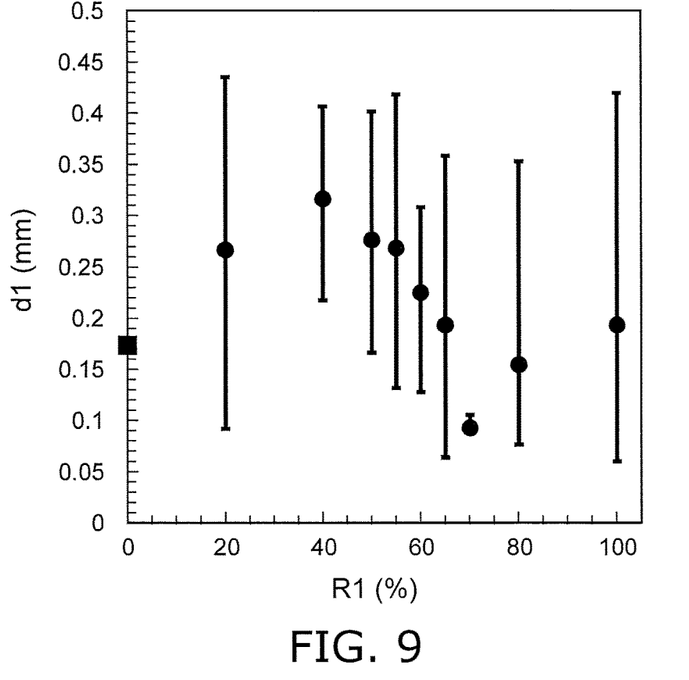
FIG. 9 is a figure showing the relationship between the laser output and the void occurrence rate.

FIG. 9 is a figure showing the relationship between the laser output and the void occurrence rate.

In FIG. 9, the horizontal axis is a ratio R1 of the output value P of the laser of the second irradiation to the output value P of the laser of the first irradiation (R1=(P2/P1) =100%). The vertical axis is a diameter d1 of the void 20b. In the example of FIG. 9, the output value P of the first irradiation is 3100 W. For example, the diameter d1 of the void 20b corresponds to the diameter of a sphere in the case where the configuration of the void 20b is spherical.

In FIG. 9, the round symbols illustrate the diameter d1 of the void 20b when the ratio R1 is 20% to 100%. The square symbol of FIG. 9 shows the diameter d1 of the void 20b in the case where the ratio R1 is 0% and the second laser irradiation is not performed. As shown in FIG. 9, compared to the other ranges of the ratio R1, the diameter d1 of the void 20b is smaller when the ratio R1 is not less than 60% and not more than 70%.

In FIG. 9, the straight lines extending above and below the round symbols show the ranges of the diameter d1 of the void 20b. For example, in the case where the ratio R1 is 20%, the value of the diameter d1 of the void 20b is in the range of 0.1 mm to 0.45 mm.

Figure 10:
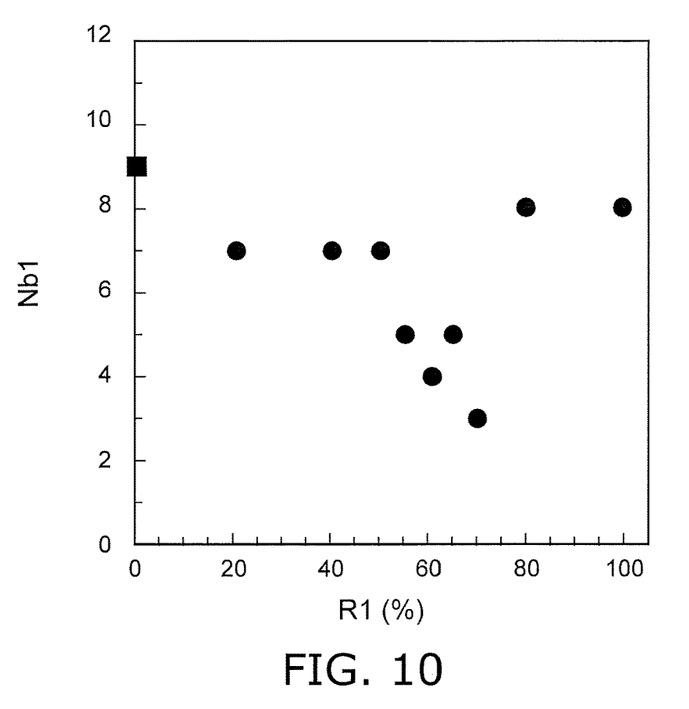
FIG. 10 is a figure showing the relationship between the laser output and the void occurrence rate.

FIG. 10 is a figure showing the relationship between the laser output and the void occurrence rate.

In FIG. 10, the horizontal axis is the ratio R1 of the output value P of the laser of the second irradiation to the output value P of the laser of the first irradiation. The vertical axis of FIG. 10 is a number Nb1 of the voids 20b. In the example of FIG. 10, the output value P of the first irradiation is 3100 W.

As shown in FIG. 10, the round symbols show the number Nb1 of the voids 20b when the ratio R1 is 20% to 100%. The square symbol shows the number Nb1 of the voids 20b in the case where the ratio R1 is 0% and the second irradiation is not performed. It can be seen from FIG. 10 that compared to the other ranges of the ratio R1, the number Nb1 of the voids 20b is smaller when the ratio R1 is not less than 60% and not more than 70%.

Figure 11:
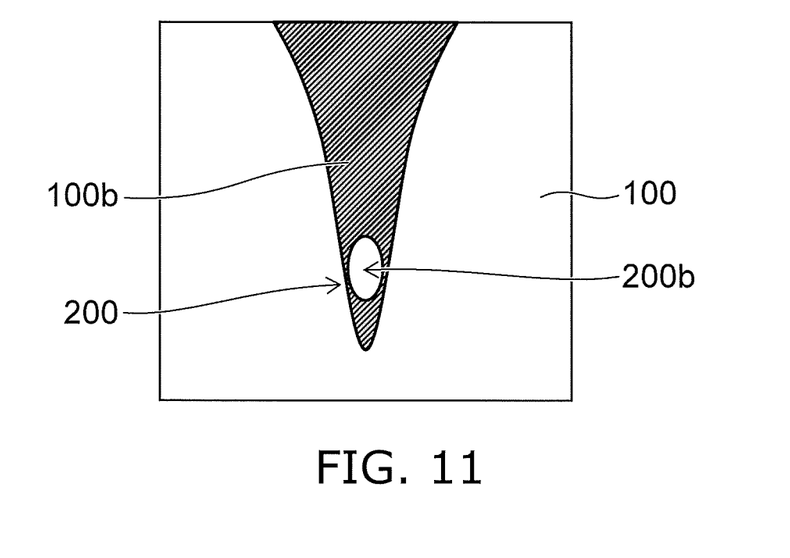
FIG. 11 is a drawing showing the state of a weld portion of a reference example.

FIG. 11 is a drawing showing the state of a weld portion of a reference example.

Cracks and/or bubbles occur easily in the welded portion in laser welding using laser light such as a pulsed laser, etc. For example, as shown in FIG. 11, the welding processing is performed by irradiating the laser on the surface of a processing object 100, by the processing object 100 melting, and by the melted metal solidifying and changing into a solid portion 100b. In such a case, a void 200b occurs easily at the lower portion of a weld portion 200. There are cases where the quality of the welding processing decreases due to the occurrence of the void 200b. In the case where components used in an apparatus are welded to each other, the reliability of the apparatus may decrease due to the occurrence of the void 200b.

In the laser processing method according to the embodiment, a laser having the output value P of 3000 W or more is irradiated on the processing object 10 as the first condition; subsequently, a laser having the output value P of not less than 60% and not more than 70% of the output value P of the first condition is irradiated on the processing object 10 as the second condition. By such irradiation conditions of the laser, the occurrence of the void 20b at the weld portion 20 can be suppressed by irradiating the laser light on the processing object 10 in stages.

For example, as shown in FIG. 4B and FIG. 5A, the volume of the void 20b is reduced by irradiating the laser on the weld portion 20 using the condition of the output value P of the laser light being not less than 60% and not more than 70% of the output value P of the first condition. For example, the void 20b is removed after the volume decreases. The occurrence of the void 20b at the weld portion 20 is suppressed.

According to the embodiment, a laser processing method having higher reliability is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A laser processing method, comprising: a first pulse irradiation process of irradiating a first laser light on a first region of a generally flat surface of a body, the generally flat surface of the body including aluminum and at least one of manganese and magnesium, a first output value of the first laser light being 3000 W or more;

a second pulse irradiation process of irradiating a second laser light on the first region upon completed duration of the first irradiation process, a second output value of the second laser light being not less than 60% and not more than 70% of the first output value; and a third irradiation process of irradiating a third laser light on the first region after the second irradiation process upon completed duration of the second irradiation process, a third output value of the third laser light being lower than the second output value, the third output value continuously decreasing, and a length of a time of the irradiating the third laser light being shorter than a length of a time of the irradiating the second laser light;

wherein the length of a time of the irradiating the third laser light is shorter than a length of a time of the irradiating the first laser light.

2. The method according to claim 1, wherein
the irradiation time of the first laser light is not less than 1.0 ms and not more than 2.0 ms, and
the irradiation time of the second laser light is not less than 2.0 ms and not more than 3.0 ms.

3. The method according to claim 2, wherein the length of the time of the irradiating the third laser light is not less than 0.5 ms and not more than 1.5 ms.

4. The method according to claim 1, wherein at least a portion of the first region melts in the first irradiation process.

5. The method according to claim 1, wherein the length of the time of the irradiating the third laser light is not less than 0.5 ms and not more than 1.5 ms.

* * * * *